United States Patent [19]
Little

[11] 3,950,025
[45] Apr. 13, 1976

[54] TAILGATE REGULATORS

[76] Inventor: Amos J. Little, Rte. 1, Waverly, Tenn. 37185

[22] Filed: Feb. 24, 1975

[21] Appl. No.: 552,367

[52] U.S. Cl. .............................. 296/56; 298/23 M
[51] Int. Cl.² ......................................... B62D 25/00
[58] Field of Search ............ 296/56, 50, 28 D, 106; 298/23 R, 23 MD, 23 M, 23 S, 23 A, 23 B, 23 F, 23 D, 23 DF, 38; 239/657, 676; 222/166

[56] References Cited
UNITED STATES PATENTS

| | | |
|---|---|---|
| 1,742,248 | 1/1930 | Gotcher .............................. 298/23 |
| 3,173,724 | 3/1965 | Sandberg ............................ 298/23 B |
| 3,804,464 | 4/1974 | Gust .............................. 296/28 D X |

Primary Examiner—Robert J. Spar
Assistant Examiner—Randolph A. Reese
Attorney, Agent, or Firm—Harrington A. Lackey

[57] ABSTRACT

A device for controlling the positions of a suspended tailgate on the rear end of the dump body of a truck vehicle, including an abutment member on the tailgate and a pivotal control arm on the dump body engaging the abutment member within a critical range of open positions of the tailgate, and power means for moving the control arm.

4 Claims, 5 Drawing Figures

TAILGATE REGULATORS

BACKGROUND OF THE INVENTION

This invention relates to dump vehicles, and more particularly to a tailgate regulator for a dump vehicle.

In a conventional truck vehicle having a dump body, the rear end of the dump body is normally closed by a tailgate freely suspended about a horizontal swing axis. Thus, as long as the dump body is in its normal loaded, horizontal position, the tailgate hangs by gravity in a vertical position for closing the rear end of the dump body. As the dump body is elevated, the rear end of the dump body moves forward away from the tailgate, which remains suspended in a truly vertical position about its swing axis, thereby opening the rear end for dumping the contents of the dump body. The higher the dump body is tilted, the greater the space or opening for discharging material between the open rear end of the dump body and the freely hanging tailgate. In these conventional dump bodies, the tailgate is usually latched in a closed position to close the open rear end of the dump body while the vehicle is loaded and transporting the loaded material from one site to another. When it is desired to dump the contents of the vehicle, the tailgate latch has to be manually or automatically removed. However, once the tailgate is unlatched, it is free to swing and seek its vertical position.

SUMMARY OF THE INVENTION

It is therefore an object of this invention to provide a regulator device for controlling the open positions of the tailgate within predetermined limits, particularly to facilitate and control the spreading of material from the dump body of a truck vehicle.

This tailgate regulator includes an abutment member disposed horizontally upon the tailgate, a pivotal control arm mounted upon the truck body adjacent the tailgate, and means for positively controlling the movement of the control arm at least toward the rear end of the dump body. The control arm has a pivoted end and a free end, so that when the tailgate is in its closed position, or in an open position within a critical angular range, the control arm will engage the horizontal abutment member to hold the tailgate in an open position determined by the attitude of the control arm. The tailgate regulator releases the tailgate by disengagement of the control arm from the horizontal abutment member after the tailgate swings away from the dump body to a predetermined critical angle.

These functions of the tailgate are determined by the relative positions of the swinging tailgate and the pivotal control arm. The swing arc of the free end of the control arm intersects the swing arc of the abutment member on the tailgate at the critical angular position of the tailgate, so that the tailgate is held in a controlled position when it is within the critical angle, and released for free swinging movement when the critical angle is exceeded.

DESCRIPTION OF THE PREFERRED EMBODIMENTS

Figure 1:
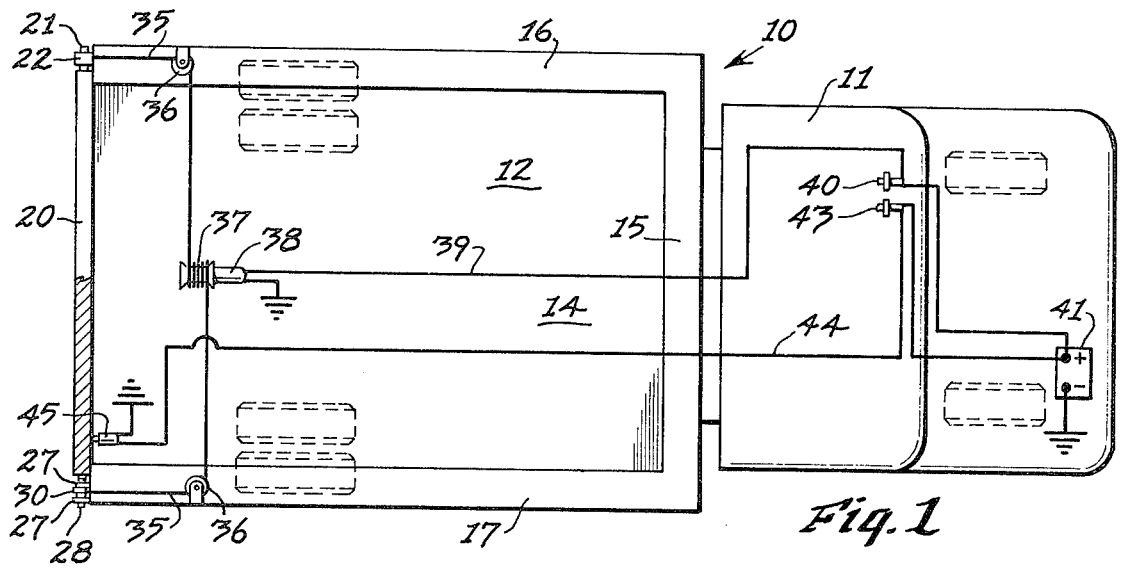
FIG. 1 is a schematic plan view of one form of regulator device applied to the tailgate of the dump body of a truck vehicle.

Referring now to the drawings in more detail, FIG. 1 discloses a vehicle truck 10, schematically, having a cab 11 and a dump body 12. The dump body 12 has a floor 14, a front wall 15 and a pair of side walls 16 and 17 defining an open rear end.

To close the open rear end of the dump body 12, a tailgate 20 is provided with a pair of laterally projecting hinge pins 21 at its top edge supported in journal bearings 22, so that the tailgate 20 is freely suspended for swinging movement about the horizontal axes of the hinge pins 21.

The tailgate regulator device made in accordance with this invention includes a pair of horizontal abutment members, rails or lugs 25 projecting laterally away from the opposite side edges near the bottom of the tailgate 20.

Mounted upon the rear faces of the side walls 16 and 17 of the dump body 12 are a pair of ear members 27 through which are journaled by pivot pins 28 control arms 30. Each pivot pin 28 is journaled through the upper or pivotal end of the control arm 30, while the bottom end 31 of the control arm is free to swing in an arc 32 about the pivotal axis of the pivot pin 28.

The pivot pins 28 are mounted below the hinge pins 21. The length of each control arm 30 is preferably less than the height of the tailgate 20, but long enough to depend below and behind each abutment member 25 when the tailgate 20 is in its closed position, as disclosed in FIG. 2. Moreover, the swinging plane of each control arm 30 is coincident, or substantially coincident, with the swinging plane of the corresponding abutment member 25.

Figures 2, 3:
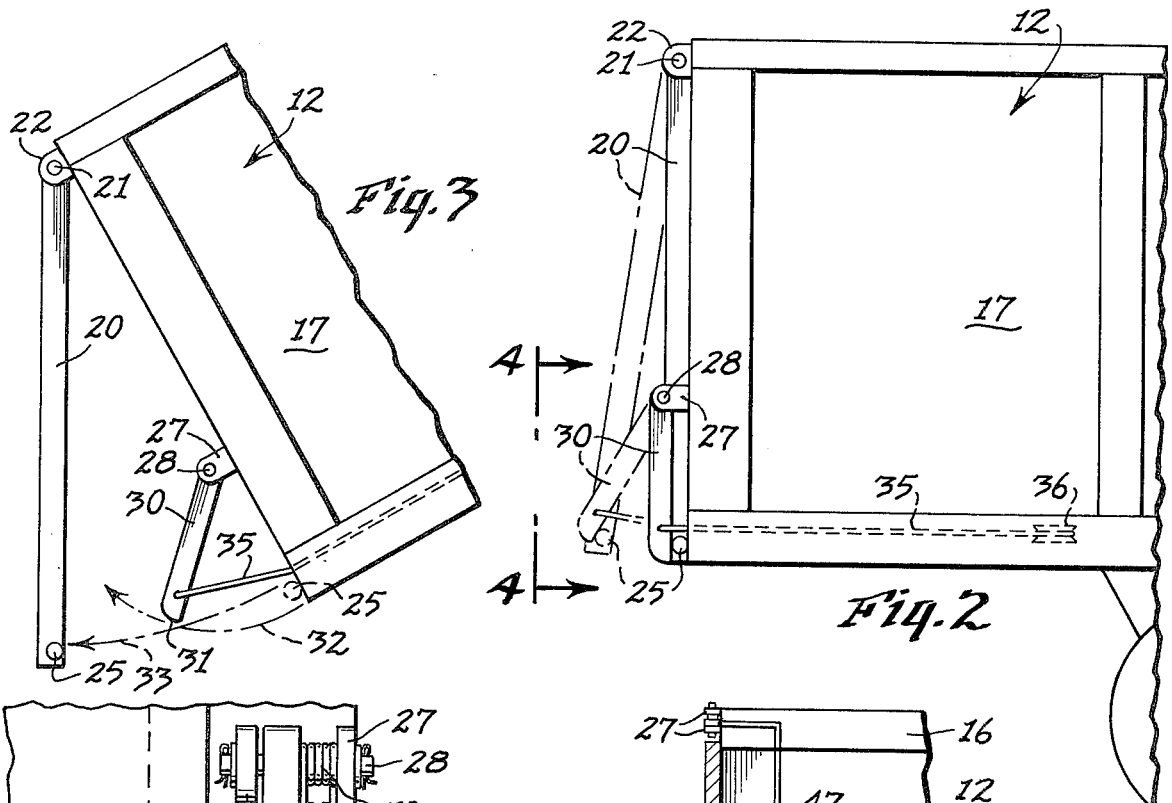
FIG. 2 is an enlarged fragmentary side elevation of the rear portion of a dump body disclosing the tailgate regulator of FIG. 1 holding the tailgate in a closed position in solid lines and a limited open position in phantom.
FIG. 3 is a fragmentary side elevation similar to FIG. 2, illustrating the position of the tailgate released from the control of the regulator device.
Figure 4:
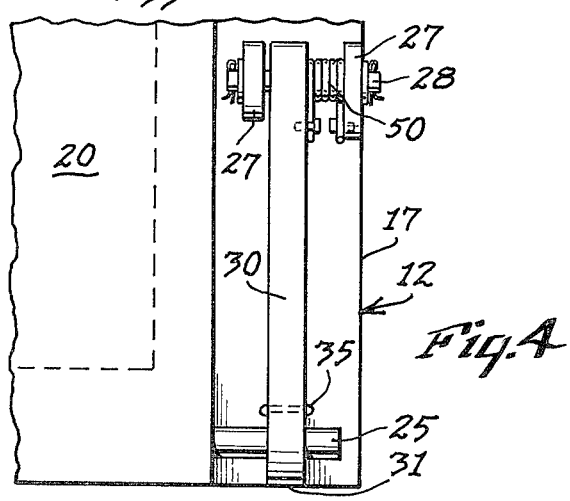
FIG. 4 is an enlarged, fragmentary, rear elevation taken along the line 4—4 of FIG. 2.

The locations of the hinge pins 21, pivot pins 28, the height of the tailgate 20 and the length of the control arms 30, are such that each control arm 30 remains behind the corresponding abutment member 25 for various open positions of the tailgate 20 within a certain critical angle between the tailgate 20 and the rear end of the dump body 12. In FIG. 2, with the tailgate 20 at a slight angle to the rear end of the dump body 12, each control arm 30 is still behind and engaging the abutment member 25. On the other hand, when the tailgate 20 occupies a position at a greater angle than the critical angle with the rear end of the dump body 12, each abutment member 25 is released from its corresponding control arm 30.

The critical open position of the tailgate 20 relative to the rear end of the dump body 12 is determined by the intersection of the swing arc 32 of the free end 31 of the control arm 30 and the swing arc of the upper edge of the abutment member 25, as illustrated in FIG. 3. When the arc 32 and the arc 33 cross so that the free end 21 of the control arm 30 is barely contiguous with the upper edge of the abutment member 25, then the tailgate 20 is released and beyond the control of the control arm 30.

In FIGS. 1 - 4, each control arm 30 is connected to a cable 35. The cables 35 are trained about sheaves 36 and wound about a common spool or windlass 37 which is adapted to be alternately rotated in opposite directions by the reversible electric motor 38. The electric motor 38 is connected in a circuit 39 including a manual switch 40 and the existing vehicle storage battery 41.

If desired, a warning light 43 may be installed on the dash in the cab 11 and connected in a circuit 44 to a switch 45 which will apprise the operator of the vehicle when the tailgate 20 is closed and when it is open.

Figure 5:
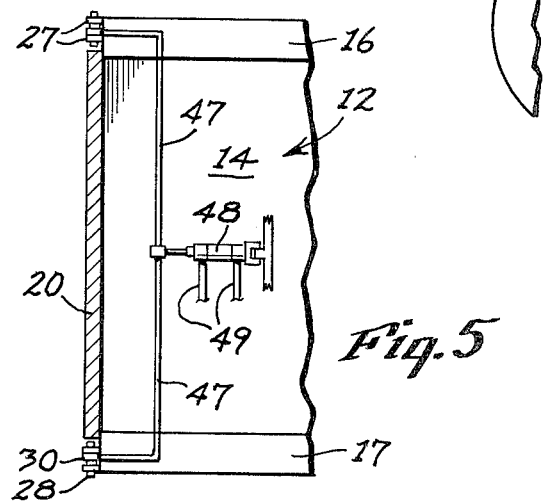
FIG. 5 is a fragmentary plan view illustrating a modified form of power means for controlling the regulator device.

If desired, the cables 35, windlass 37, electric motor 38 and electrical circuit 39 may be replaced by a yoke 47 and reversely reciprocable hydraulic or pneumatic cylinder 48 including a hydraulic or pneumatic circuit 49, as illustrated in FIG. 5. The circuit 49 may be controlled by conventional controls, not shown, for reversing the actuation of the cylinder 48 in order to move the yoke 47 toward and away from the truck body 12, thereby positively moving the tailgate 20, to which the yoke 47 is connected, positively toward or away from the truck body 12.

In the modification disclosed in FIGS. 1 - 4, where the cable 35 exerts positive pulling force upon the control arms 30 in a forward direction only, the control arms 30 may be provided with coil springs 50 (FIG. 4) biased to urge the control arms 30 rearward, or away from the dump body 12. Thus, the control arms 30 are normally forced away from the truck body 12 by the springs 50, and moved toward the truck body 12 to overcome the action of the coil springs 50, by means of the cables 35 and the electric windlass 37.

In the operation of the tailgate regulator made in accordance with this invention, the dump body 12 is normally in its horizontal position, so that the tailgate 20 normally drops by gravity to its vertical position closing the rear end of the dump body 12. When the tailgate 20 is in its closed position, the control arms 30 depend behind the abutment members 25, and are pulled forward by the cables 35 against the abutment members 25 to positively latch the tailgate 20 in its closed position.

As long as the control arms 30 are positively held in the solid-line position of FIG. 5, the tailgate 20 will remain closed, regardless of the attitude of the dump body 12.

When it is desired to spread a limited, uniform amount of material, such as sand, limestone or gravel, from the loaded dump body 12, the operator pushes the switch 40 to drive the motor 38 in a direction to pay out cable 35 a limited amount, such as the amount disclosed in FIG. 2. The controls, not shown, are then actuated to tilt the dump body 12 sufficiently that the tailgate 20 will swing rearwardly relative to the open rear end of the dump body 12. However, if the dump body 12 is tilted too high, the attitude of the tailgate 20 will be limited by the engagement of the abutment members 25 with the control arms 30 which are held in their positions disclosed in phantom in FIG. 2 by the stationary cables 35. Thus, it is not necessary to accurately control the tilting of the dump body 12 for the desired uniform spreading of the loaded material in the dump body 12.

After the material has been spread and the dump body 12 emptied, the dump body 12 may be restored to its horizontal position, in which event the tailgate 20 swings back to its closed position. The control arms 30 may then be positively pulled and held in their vertical closed position by retracting the cables 35 to the solid-line position of FIG. 2, if desired.

When it is desired to rapidly dump the load of the dump body 12, the switch 40 is actuated to drive the motor 38 thereby paying out cable 35 until the control arms 30 are free to swing away from the dump body 12 to a position in which the swing arc 32 will cross the swing arc 33 of the tailgate. Thus, when the dump body 12 is tilted to a high enough angle, the tailgate 20 will swing rearward causing the abutment members 25 to force rearward the control arms 30 until the abutment members 25 have escaped beneath the free ends 31 of the control arms 30. After passing this critical angular position, the tailgate 20 continues to swing by gravity to seek its true vertical position. Thus, the load discharged from the open rear end of the dump body 12 is free to rapidly fall upon the ground through the large opening between the tailgate 20 and the rear end of the dump body 12. Moreover, if the opening is not great enough, the load merely forces the tailgate 20 rearward beyond its vertical position until the contents of the dump body 12 have been exhausted.

The spring 50 maintains the control arms 30 in their rearmost position limited only by the amount of cable 35 paid out. After the dump body 12 has been rapidly depleted of its load, the dump body 12 is restored to its horizontal position, whereby the tailgate 20 swings forward with the abutment members 25 passing beneath the free ends 31 of the spring-biased control arms 30 until the tailgate 20 is in its closed position. Then the electrical controls are again actuated to wind up the cable 35 until the control arms 30 again latch the tailgate 20, through engagement with the abutment members 25, in closed position.

The tailgate 20, controlled by the hydraulic cylinders 48 of FIG. 5, will function substantially in the same manner as it does when it is controlled by the electrically wound cables 35, with the exception that the spring 50 is not required, since the hydraulic cylinder 38 is capable of positive movement of the control arms 30 in either forward of rearward directions.

What is claimed is:

1. In a truck vehicle including a dump body having an open rear end and a tailgate having upper and side edge portions, said tailgate being pivotally mounted on said dump body to swing about a horizontal axis along its upper edge portion toward a closed position closing the rear end of the dump body and away from said rear end to various open positions, a regulator device for controlling the open and closed positions of said tailgate comprising:

a. a substantially horizontal abutment member on said tailgate, b. a control arm of predetermined length having a free end and a pivotal end, c. means journaling the pivotal end of said control arm upon said dump body below the horizontal swing axis of said tailgate but above said abutment member in closed position so as to allow said control arm to swing about a substantially horizontal axis, d. the swing arc of the free end of said control arm intersecting the swing arc of said abutment member when said tailgate occupies an open critical position at a predetermined critical acute angle from said closed position,
e. said control arm being in an operative position engaging said abutment member while said tailgate occupies a position between said closed position and said critical position, said control arm disengaging said abutment member while said tailgate occupies any open position beyond said critical position from said closed position, and
f. means connected to said control arm for positively pulling said control arm toward said rear end of said dump body.

2. The invention according to claim 1 in which said abutment member projects laterally from a side edge portion of said tailgate, the swing path of said control arm being in a plane substantially coinciding with the swing path of said abutment member.

3. The invention according to claim 2 comprising a pair of said abutment members, one abutment member projecting laterally from each side edge portion of said tailgate, a pair of said control arms, each control arm having a swing path coinciding with the swing path of one of said abutment members on each side of said tailgate, said positive pulling means comprising means for positively pulling both control arms simultaneously.

4. The invention according to claim 1 further comprising spring means connected to said control arm for urging said control arm to swing away from said rear end.

* * * * *